United States Patent
Koyanagi et al.

(10) Patent No.: US 7,192,986 B2
(45) Date of Patent: *Mar. 20, 2007

(54) INORGANIC COMPOUND SOL MODIFIED BY ORGANIC COMPOUND

(75) Inventors: Tsuguo Koyanagi, Kitakyushu (JP); Hiroyasu Nishida, Kitakyushu (JP)

(73) Assignee: Catalysts & Chemicals Industries Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/038,230

(22) Filed: Mar. 11, 1998

(65) Prior Publication Data

US 2003/0193037 A1  Oct. 16, 2003

(30) Foreign Application Priority Data

Mar. 12, 1997 (JP) .................. 9/057787

(51) Int. Cl.
- B01J 13/00 (2006.01)
- C01B 13/14 (2006.01)
- C09C 1/30 (2006.01)
- C09C 3/08 (2006.01)
- C09K 3/00 (2006.01)

(52) U.S. Cl. .............. 516/34; 516/31; 516/77; 427/220; 428/405; 106/287.11; 106/287.13; 106/287.14; 106/287.15; 977/773

(58) Field of Classification Search ............. 516/31, 516/34, 77; 427/220; 428/405; 106/287.13, 106/287.11, 287.14, 287.15; 977/773
See application file for complete search history.

(56) References Cited

U.S. PATENT DOCUMENTS

| | | | | |
|---|---|---|---|---|
| 3,689,300 A | * | 9/1972 | Bunger et al. | 106/287.13 |
| 3,909,278 A | * | 9/1975 | Johnson | 501/95.1 |
| 4,015,031 A | * | 3/1977 | Reinhardt et al. | 427/220 |
| 4,373,060 A | * | 2/1983 | Ching | 106/287.13 |
| 4,822,828 A | * | 4/1989 | Swofford | 522/84 |
| 5,236,622 A | * | 8/1993 | Yoneda et al. | 516/34 |
| 5,316,714 A | * | 5/1994 | Yoneda et al. | 264/210.6 |
| 5,316,854 A | * | 5/1994 | Lin et al. | 106/287.13 |
| 5,322,888 A | * | 6/1994 | Kato et al. | 106/287.15 |
| 5,366,545 A | * | 11/1994 | Yajima et al. | 106/286.4 |
| 5,593,781 A | * | 1/1997 | Nass et al. | 427/220 |
| 5,651,921 A | * | 7/1997 | Kaijou | 516/34 |
| 5,654,090 A | * | 8/1997 | Kayanoki | 428/329 |
| 5,858,077 A | * | 1/1999 | Kayanoki | 106/287.11 |
| 5,888,290 A | * | 3/1999 | Engle et al. | 106/287.13 |
| 5,935,700 A | * | 8/1999 | Enomoto et al. | 428/330 |
| 6,680,040 B1 | * | 1/2004 | Nishida et al. | 423/335 |

FOREIGN PATENT DOCUMENTS

| WO | WO 95/33787 | * | 12/1995 |
|---|---|---|---|
| WO | WO 97/00995 | * | 1/1997 |

OTHER PUBLICATIONS

Webster's II New Riverside University Dictionary (Reference Division, Houghton Mifflin Company, Boston, Mass., copyright 1984) p. 290, 1984 month unknown.*

* cited by examiner

Primary Examiner—Daniel S. Metzmaier
(74) Attorney, Agent, or Firm—The Webb Law Firm

(57) ABSTRACT

An inorganic compound sol comprises a dispersion medium and, dispersed therein, inorganic compound particulates whose surface has been modified by an organic compound exhibiting a molecular polarizability of from $2\times10^{-40}$ to $850\times10^{-40} C^2 m^2 J^{-2}$. The inorganic compound sol modified by an organic compound possesses a desirable affinity with the dispersion media, providing excellent dispersion stability in solvents while avoiding aggregation of particulates.

1 Claim, No Drawings

INORGANIC COMPOUND SOL MODIFIED BY ORGANIC COMPOUND

FIELD OF THE INVENTION

The present invention relates to an inorganic compound sol having inorganic compound particulates dispersed in a dispersion media, which inorganic compound sol can be used in a coating material, a hard coating agent, an insulating coat and a protective coat of electrical and electronic part, an additional agent of cement, and a binder of inorganic fiber, etc. More particularly, the present invention is concerned with an inorganic compound sol in which the surface of inorganic compound particulates is modified by a specified organic compound to thereby exhibit excellent dispersion stability in dispersion media.

BACKGROUND OF THE INVENTION

Particulates of an inorganic oxide such as silica or alumina must generally have their surface rendered hydrophobic for obtaining an organic solvent dispersion thereof. Thus, generally, the surface of such particulates is modified.

A method of modifying the surface of such inorganic compound particulates comprises reacting, for example, a reactive monomer or a coupling agent with hydroxyl groups of the particulate surface. This method is carried out, for example, by dispersing powdery particulates in an organic solvent and adding a modifier to the dispersion to thereby modify the particulate surface, or by conducting a solvent substitution so as to replace water of an aqueous dispersion of particulates by an organic solvent and adding a modifier to the dispersion to thereby modify the particulate surface.

However, these methods cannot completely inhibit the aggregation of particulates, thereby rendering it difficult to obtain an organic solvent sol of high dispersibility.

Moreover, the problem has been encountered such that, when the above inorganic compound particulates are used as a filler in, for example, a coating material, a hard coating agent component of an insulating coat and a protective coat, adding a sol thereof to a matrix of coating film forming agent is likely to invite an aggregation of particulates in the matrix. Especially, the defect has been encountered such that, when the organic solvent sol is used in the presence of cation, anion, or surfactant, particulates may be aggregated and a gelation may occur.

For example, for the use for the coating material, in order to improve the hardness, water resistance and stain resistance of the coating films, an organic solvent sol in which the inorganic compound particulates had been dispersed has been used. However, a problem has been encountered such that the coating material becomes viscous and whitens since such organic solvent sol is poor in its compatibility with the coating film-formed resin and the resin emulsion being obtained.

Further, for the hard coating agent, in order to improve properties of the film being formed, such as the hardness and water resistance, inorganic compound particulates have been used as fillers. However, a problem has been encountered such that the hard coating film being formed therefor becomes opaque since the particulates are poor in the dispersing stability in the coating solution used in the coating film forming process. Also in the case that such organic solvent sol is used as a solution for an insulating film and a protective film forming for electrical and electronic components, and the like, the problem has been encountered such that the coating solution becomes viscous since the particulates are poor in dispersibility in the coating solution.

Furthermore, in order to improve soil strength, a sol in which inorganic compound particulates had been dispersed has been added to a cement as a soil stabilizer. In the event that the sol is poor in stability, the problem has been encountered that it has been hard to fill up crevices between the soils and moles with the inorganic compound particulates.

OBJECT OF THE INVENTION

The present invention has been made in view of the above circumstances, and an object of the present invention is to provide an inorganic compound sol modified by an organic compound, which is excellent in dispersion stability.

SUMMARY OF THE INVENTION

The inorganic compound sol of the present invention comprises a dispersion medium and, dispersed therein, inorganic compound particulates whose surface has been modified by an organic compound exhibiting a molecular polarizability of from $2 \times 10^{-40}$ to $850 \times 10^{-40} C^2 m^2 J^{-1}$.

It is preferred that the inorganic compound particulates are silica particulates, or composite oxide particulates composed of silica and at least one inorganic oxide other than silica.

Further, the above dispersion medium preferably has a dielectric constant of from 10 to 85.

DETAILED DESCRIPTION OF THE INVENTION

The present invention will be described in greater detail below.

The inorganic compound sol of the present invention comprises a dispersion medium and, dispersed therein, inorganic compound particulates whose surface has been modified by an organic compound exhibiting a molecular polarizability of from $2 \times 10^{-40}$ to $850 \times 10^{-40} C^2 m^2 J^{-1}$.

The terminology "molecular polarizability" used herein defines the magnitude of dipole moment which is produced by a shift of negatively charged electron cloud of a molecule from the positively charged nucleus by the action of external electric field surrounding the molecule. The molecular polarizability is expressed by the formula:

$$\alpha_o = 4\pi \in_o R^3 \ (C^2 m^2 J^{-1})$$

wherein $\alpha_o$ represents the molecular polarizability, $\in_o$ represents the dielectric constant, and R represents the molecular radius.

Inorganic Compound Particulates

Examples of the inorganic compound particulates suitably employed in the present invention include particulates of silica, alumina, titania, zirconia and other inorganic oxides or composite oxides of these. Of the above particulates, silica particulates or composite oxides be composed of silica and at least one inorganic oxide other than silica such as silica/alumina and silica/zirconia are preferred. The above silica particulates can be produced by, for example, the process described in the applicant's prior applications published as Japanese Patent Publication Nos. 4(1992)-56775 and 4(1992)-55125.

Examples of the inorganic oxides other than silica include oxides of elements selected from among those of Group 1A, Group 2A, Group 2B, Group 3A, Group 3B, Group 4A, Group 4B, Group 5A, Group 5B and Group 6A of the periodic table. Specific examples thereof include $Li_2O$, $Na_2O$, $K_2O$, $Rb_2O$, BeO, MgO, CaO, ZnO, $Y_2O_3$, $La_2O_3$, $Al_2O_3$, $Ga_2O_3$, $B_2O_3$, $Ce_2O_3$, $Sb_2O_3$, $P_2O_5$, $TiO_2$, $ZrO_2$, $SnO_2$, $MoO_3$ and $WO_3$.

The above silica containing composite oxides can be produced by, for example, the process described in the applicant's prior applications published as Japanese Patent Laid-open Publication Nos. 5(1993)-132309 and 7(1995)-10522.

For example, the silica containing composite oxides can be produced by simultaneously adding an alkali metal silicate, such as sodium silicate, and an alkali soluble inorganic compound to an alkali aqueous solution having a pH value of at least 10 and reacting them without controlling the pH concentration of the reaction mixture.

Alternatively, the silica containing composite oxides can be produced by dispersing seed particulates composed of particulates of silica, alumina and other inorganic oxides in an alkali aqueous solution having a pH value of at least and adding the above silicate and alkali soluble inorganic compound to the dispersion so that the particulates grow.

In the silica containing composite oxide particulates, the weight ratio of silica to inorganic oxides other than silica ($SiO_2$/other inorganic oxides) preferably ranges from 0.1 to 500 and, still preferably, from 5 to 300.

The size of inorganic compound particulates for use in the present invention is not particularly limited as long as the sol containing the inorganic compound particulates is stable.

These inorganic compound particulates are preferably contained in the inorganic compound sol in an amount of from 1 to 50% by weight, still preferably, from 5 to 30% by weight.

Organic Compound

In the inorganic compound sol of the present invention, the surface of the above inorganic oxide is modified by an organic compound exhibiting a molecular polarizability of from $2 \times 10^{-40}$ to $850 \times 10^{-40} C^2 m^2 J^{-1}$, preferably, from $5 \times 10^{-40}$ to $850 \times 10^{-40} C^2 m^2 J^{-1}$.

Examples of the organic compounds exhibiting the above molecular polarizability include:

vinylsilane compounds such as vinyltrimethoxysilane, vinyltriethoxysilane, vinylmethyldimethoxysilane, vinylmethyldiethoxysilane and vinylphenyldimethoxysilane;

acrylsilane compounds such as γ-acryloxypropyltrimethoxysilane, γ-acryloxypropylphenyldimethoxysilane, γ-methacryloxypropyltrimethoxysilane and γ-methacryloxypropylphenyldimethoxysilane;

epoxysilane compounds such as glycidoxypropyltrimethoxysilane and γ-glycidoxypropylmethyldiethoxysilane;

aminosilane compounds such as γ-aminopropyltriethoxysilane; and

γ-mercaptopropyltrimethoxysilane and γ-chloropropyltrimethoxysilane.

Also, use can be made of a reactive monomer such as styrene monomer or an acrylic acid monomer, e.g., ethyl methacrylate. Further, use can be made of a linear alcohol such as butanol.

The reactive monomer may polymerize at the stage of modification, so that at least part thereof becomes a polymer.

The above organic compounds may be used either individually or in combination.

When the molecular polarizability of the organic compound is lower than $2 \times 10^{-40} C^2 m^2 J^{-1}$, the organic properties of the organic compound are decreased so that the organic compound has low affinity with the organic solvent. Therefore, the particulates whose surface has been modified by this organic compound have poor dispersibility in the organic solvent. In particular, when an acid, a base, a salt, or a surfactant thereof is present in the inorganic compound sol, the particulates are likely to aggregate with each other.

Dispersion Media

In the inorganic compound sol of the present invention, preferred use is made of a dispersion medium (solvent) whose dielectric constant is from 10 to 85. When the dielectric constant is less than 10, the particulates are unstable in the sol, so that a gelation may occur.

Examples of such organic solvents include water; monohydric alcohols such as ethanol, propanol and butanol; polyhydric alcohols such as ethylene glycol and propylene glycol; alcohol ethers such as ethylene glycol monoethyl ether; amide solvents such as N-methylformamide, N,N-dimethylformamide and N-methylacetamide; and lactones such as γ-butyrolactone and N-methyl-2-pyrrolidone. These dispersion media may be used either individually or in combination. When water is used as a dispersion medium, a dielectric constant of used water is preferably from 60 to 85.

An organic or inorganic acid, an organic base or inorganic base, a salt, or a surfactant thereof may be added to these dispersion media. Examples of suitable organic or inorganic acids thereof include hydrochloric acid, sulfuric acid, nitric acid, phosphoric acid, perchloric acid, acetic acid. Examples of suitable organic or inorganic bases thereof include ammonium hydroxide, organic amine, hydroxide of alkali metals or alkali earth metals. Examples of suitable surfactants thereof include sodium alkylbenzenesulfonate, sodium alkylsulfonate.

Method of Preparing Inorganic Compound Sol

The inorganic compound sol of the present invention can be prepared by the following method.

In the step (a), an organic compound for modifying the surface of inorganic compound particulates is added to a dispersion of inorganic compound particulates.

The dispersion of inorganic compound particulates may be a water dispersion, an organic solvent dispersion, or a dispersion in a mixture of water and an organic solvent.

It is preferred that the inorganic compound particulates be contained in the above dispersion in an amount of 0.1 to 50% by weight, especially, 1 to 20% by weight.

The surface modifying organic compound is added preferably in an amount of $0.1 \times 10^{-6}$ to $50 \times 10^{-6}$ mol/m² and, still preferably, $1 \times 10^{-6}$ to $30 \times 10^{-6}$ mol/m² in terms of the amount of modification per outer surface area of the inorganic compound particulates dispersed in the dispersion. When the amount is less than $0.1 \times 10^{-6}$ mol/m², the effect of modification is unsatisfactory. Even when the organic compound is used in amounts greater than $50 \times 10^{-6}$ mol/m², the effect of modification is no longer enhanced.

In the step (b), after the addition of a specified amount of surface modifying organic compound, the dispersion is heated at 50° C. or higher temperatures, preferably, 60° C. or higher temperatures.

Thus, the surface of the inorganic compound reacts with the surface modifying organic compound, so that the modification of the surface of the inorganic compound is advanced.

In the step (c), when a dispersion medium (organic solvent) whose dielectric constant is lower than 10 is contained in the surface-modified inorganic compound sol obtained above, a solvent displacement replacing it by dispersion media whose dielectric constant is at least 10 may be carried out.

The solvent displacement may be performed by the use of, for example, an ultrafilter or a rotary evaporator.

EFFECT OF THE INVENTION

In the inorganic compound sol of the present invention, the surface of the inorganic compound particulates is modified by the organic compound having specified molecular polarizability. Therefore, the inorganic compound particulates have desirable affinity with the dispersion media, so that the dispersion stability thereof in the dispersion media is excellent without the occurrence of aggregation of particulates and gelation. Further, even if an organic or inorganic acid or a salt thereof is present in the inorganic compound sol, the inorganic compound particulates would not aggregate with each other and the gelation would not occur.

When the inorganic compound sol of the present invention is blended as a filler in, for example, a coating material or a hard coating agent and even if an acid, base, salt, surfactant, et al. is present in the inorganic compound sol, the finally obtained coating film is substantially free from a transparency decrease and cracking attributed to the aggregation of particulates and the gelation. Therefore, the inorganic compound sol of the present invention is useful as a filler to be blended in not only various coating materials and hard coating agents but also in various resins. The inorganic compound sol is suitably employed as, for example, a magnetic tape filler or as a film blocking preventive agent.

Further, when the inorganic compound sol of the present invention is added to a cement, excessively quick caking of a cement is retarded because of a low gelation rate. The inorganic compound sol can easily fill up crevices between the soils and moles. The cement is caked after filling. Therefore, the inorganic compound sol of the present invention is useful as an additive for cement for water stop or soil strength.

EXAMPLE

The present invention will now be illustrated in greater detail with reference to the following Examples, which in no way limit the scope of the invention.

Example 1

(a) Preparation of surface-modified sol.

500 g of a silica/alumina water dispersion sol (Catalysts & Chemicals Industries Co., Ltd., Cataloid-SN, weight ratio of $SiO_2/Al_2O_3$=285.7, average particle size: 12 nm and solid content: 20% by weight) was used as a starting material and subjected to a solvent displacement by means of an ultrafilter to thereby replace the water by methanol. Thus, there was obtained a methanol dispersion sol having a solid content of 30% by weight.

300 g of this sol was mixed with 2700 g of ethanol, and 8.4 g of γ-glycidoxypropyltrimethoxysilane was added to the mixture. The mixture was agitated for 1 hr, thereby obtaining a sol containing silica/alumina particulates whose surface was modified by γ-glycidoxypropyltrimethoxysilane.

196 g of ethylene glycol was added to the obtained sol and heated at 60° C. for 1 hr. Thereafter, ethanol was removed in vacuum by the use of a rotary evaporator, thereby obtaining a surface-modified silica/alumina sol of 30% by weight in solid content which contained ethylene glycol as a dispersion medium.

(b) Evaluation of sol stability I.

10 parts by weight of each of an aqueous solution of sulfuric acid (2% by weight) and an aqueous solution of hydrochloric acid (2% by weight) was mixed with 100 parts by weight of the obtained surface-modified silica/alumina sol, and the sol stability I was evaluated.

The results are given in Table 1.

(c) Evaluation of sol stability II.

10 parts by weight of an aqueous solution of ammonium sulfate (5% by weight) was mixed with 100 parts by weight of the obtained surface-modified silica/alumina sol, and a mixture was stirred for 10 min. Then the mixture was allowed to stand in a bath kept at 70° C., and the sol stability II was evaluated.

The results are given in Table 2.

(d) Evaluation of sol stability III.

10 parts by weight of an aqueous solution of sodium chloride (5% by weight) was mixed with 100 parts by weight of the obtained surface-modified silica/alumina sol, and a mixture was stirred for 10 min. Then the mixture was allowed to stand in a bath kept at 70° C., and the sol stability III was evaluated.

The results are given in Table 3.

Example 2

A surface-modified silica/zirconia sol was obtained in the same manner as in Example 1, except that a silica/zirconia water dispersion sol (weight ratio of $SiO_2/ZrO_2$: 3, average particle size: 30 nm and solid content: 20% by weight) was used as a starting material.

The sol stability I of the obtained surface-modified silica/zirconia sol was evaluated in the same manner as in Example 1.

The results are given in Table 1.

Example 3

A surface-modified silica/titania sol was obtained in the same manner as in Example 1, except that a silica/titania water dispersion sol (weight ratio of $SiO_2/TiO_2$: 9, average particle size: 10 nm and solid content: 20% by weight) was used as a starting material.

The sol stability I of the obtained surface-modified silica/titania sol was evaluated in the same manner as in Example 1.

The results are given in Table 1.

Example 4

A surface-modified composite oxide sol was obtained in the same manner as in Example 1, except that a sol mixture consisting of 250 g of a silica/alumina water dispersion sol (weight ratio of $SiO_2/Al_2O_3$: 285.7, average particle size: 12 nm and solid content: 20% by weight) and 250 g of a silica/zirconia water dispersion sol (weight ratio of $SiO_2/ZrO_2$: 3, average particle size: 30 nm and solid content: 20% by weight) was used as a starting material.

The sol stability I of the obtained surface-modified composite oxide sol was evaluated in the same manner as in Example 1.

The results are given in Table 1.

Example 5

A surface-modified silica/tin oxide sol was obtained in the same manner as in Example 1, except that a silica/tin oxide water dispersion sol (weight ratio of $SiO_2/SnO_2$: 19, average particle size: 10 nm and solid content: 20% by weight) was used as a starting material and that N-methylpyrrolidone was used as a dispersion medium.

The sol stability I of the obtained surface-modified silica/tin oxide sol was evaluated in the same manner as in Example 1.

The results are given in Table 1.

Example 6

A surface-modified silica/indium oxide sol was obtained in the same manner as in Example 1, except that a silica/indium oxide water dispersion sol (weight ratio of $SiO_2/In_2O_3$: 5.7, average particle size: 11 nm and solid content: 20% by weight) was used as a starting material and that γ-butyrolactone was used as a dispersion medium.

The sol stability I of the obtained surface-modified silica/indium oxide sol was evaluated in the same manner as in Example 1.

The results are given in Table 1.

Example 7

A surface-modified silica/alumina sol was obtained in the same manner as in Example 1, except that 5.0 g of vinyltrimethoxysilane was used in place of 8.4 g of γ-glycidoxypropyltrimethoxysilane.

The sol stability I of the obtained surface-modified silica/alumina sol was evaluated in the same manner as in Example 1.

The results are given in Table 1.

Example 8

A surface-modified silica/antimony oxide sol was obtained in the same manner as in Example 1, except that a silica/antimony water dispersion sol (weight ratio of $SiO_2/Sb_2O_5$: 5.7, average particle size: 15 nm and solid content: 20% by weight) was used as a starting material.

The sol stability I of the obtained surface-modified silica/antimony oxide sol was evaluated in the same manner as in Example 1.

The results are given in Table 1.

Example 9

A surface-modified silica/tungsten oxide sol was obtained in the same manner as in Example 1, except that a silica/tungsten oxide water dispersion sol (weight ratio of $SiO_2/WO_3$: 4, average particle size: 16 nm and solid content: 20% by weight) was used as a starting material, that 9.0 g of γ-methacryloxypropyl-trimethoxysilane was used in place of 8.4 g of γ-glycidoxypropyltrimethoxysilane and that methyl cellosolve was used in place of ethylene glycol as a dispersion medium.

The sol stability I of the obtained surface-modified silica/tungsten oxide sol was evaluated in the same manner as in Example 1.

The results are given in Table 1.

Example 10

The methanol-dispersed silica/alumina sol of 30% by weight in solid content which was obtained in Example 1 was diluted with methanol to a solid content of 5% by weight. 8 g of 2,2'-azobis(2-aminodipropane) dihydrochloride was added to 1000 g of the resultant sol and, further, 30 g of styrene monomer was mixed thereinto, followed by agitation at 85° C. for 5 hr. Thus, there was obtained a sol comprising silica/alumina particulates whose surface was modified by polystyrene.

450 g of ethylene glycol was added to the obtained sol and the obtained sol was heated at 60° C. for 1 hr. Thereafter, alcohol was removed in vacuum by the use of a rotary evaporator, thereby obtaining a surface-modified silica/alumina sol of 10% by weight in solid content which contained ethylene glycol as a dispersion medium.

The sol stability I of the obtained surface-modified silica/alumina sol was evaluated in the same manner as in Example 1.

The results are given in Table 1.

Example 11

A surface-modified silica/alumina sol was obtained in the same manner as in Example 10, except that methyl methacrylate was used in place of styrene.

The sol stability I of the obtained surface-modified silica/alumina sol was evaluated in the same manner as in Example 1.

The results are given in Table 1.

Example 12

340 g of n-butanol was added to 300 g of the methanol-dispersed sol of silica/alumina composite oxide (solid content: 20% by weight) prepared by the same solvent substitution as in Example 1, and a solvent displacement was carried out in vacuum. Thus, there was obtained 400 g of a sol of silica/alumina dispersed in n-butanol. This sol was heated at 150° C. for 3 hr in an autoclave.

240 g of ethylene glycol was added to the obtained sol and heated at 60° C. for 1 hr. Thereafter, n-butanol was removed in vacuum by the use of a rotary evaporator, thereby obtaining a sol of silica/alumina whose surface was modified by n-butanol, which had a solid content of 20% by weight and which contained ethylene glycol as a dispersion medium.

The sol stability I of the obtained surface-modified silica/alumina sol was evaluated in the same manner as in Example 1.

The results are given in Table 1.

Example 13

(a) Preparation of surface-modified sol.

330 g of a silica water dispersion sol (Catalysts & Chemicals Industries Co., Ltd., Cataloid-SI-30, average particle size: 12 nm and solid content: 30% by weight) as a starting material was mixed with 170 g of water and 50 g of cation-exchange resin, and followed by agitation for 30 min.

The cation-exchange resin separated from the mixture, and then 6.7 g of γ-glycidoxypropyltrimethoxysilane was added to 400 g of the obtained silica sol having pH value of 4. The mixture was agitated for 1 hr at 60° C., thereby obtaining a sol containing silica/alumina particulates whose surface was modified by γ-glycidoxypropyltrimethoxysilane.

Thereafter, the sol containing silica particulates was concentrated in vacuum by the use of a rotary evaporator, thereby obtaining a surface-modified silica sol of 30% by weight in solid content which contained water as a dispersion medium.

The sol stability II and III of the obtained surface modified silica sol was evaluated in the same manner as in Example 1.

The results are given in Table 2 and 3.

(b) Evaluation of sol stability IV.

A mixed solution (A) which was mixed 100 parts by weight of the obtained surface-modified silica sol and 100 parts by weight of water and the other mixed solution (B) which was mixed 250 parts by weight of a portland cement and 420 parts by weight of water mixed and kept at 30° C. Then the time taken until the mixture cemented was measured as the evaluation of sol stability IV.

The results are given in Table 4.

(c) Evaluation of sol stability V.

100 parts by weight of an acrylic resin emulsion produced by Union Paint Company which was dispersion having pH value of 9 of an acrylic resin of 50% by weight in aqueous solution containing surfactant was mixed with 100 parts by weight of the obtained surface-modified silica sol, and a mixture was stirred for 10 min. Then the mixture was allowed to stand in a bath kept at 70° C., and the sol stability was evaluated.

The results are given in Table 5.

Comparative Example 1

A silica/alumina sol containing ethylene glycol as a dispersion medium was obtained from the silica/alumina water dispersion sol of Example 1 in the same manner as in Example 1, except that any modification using an organic compound was not performed.

The sol stability I of the obtained silica/alumina sol was evaluated in the same manner as in Example 1.

The results are given in Table 1.

Comparative Example 2

A silica/alumina sol was obtained in the same manner as in Example 1, except that 4 g of monomethyl-trimethoxysilane was used in place of 8.4 g of γ-glycidoxypropyltrimethoxysilane.

The sol stability I of the obtained silica/alumina sol was evaluated in the same manner as in Example 1.

The results are given in Table 1.

Comparative Example 3

A silica/zirconia sol was obtained from the silica/zirconia water dispersion sol (weight ratio of $SiO_2/ZrO_2$: 3, average particle size: 30 nm and solid content: 20% by weight) of Example 2 in the same manner as in Example 2, except that any surface modification using an organic compound was not performed and that N-methylpyrrolidone was used as a dispersion medium.

The sol stability I of the obtained silica/zirconia sol was evaluated in the same manner as in Example 1.

The results are given in Table 1.

Comparative Example 4

The sol stability II, III, IV and V of a silica water dispersion sol (Catalysts & Chemicals Industries Co., Ltd., Cataloid-SI-30, average particle size: 12 nm and solid content: 30% by weight) was evaluated in the same manner as in Example 13.

The results are given in Table 2 to 5.

TABLE 1

| | Sol composition | Modifying organic compound | mol. polarizability |
|---|---|---|---|
| Ex. 1 | $SiO_2 \cdot Al_2O_3$ | γ-glycidoxypropyl trimethoxysilane | $10.4 \times 10^{-40}$ |
| Ex. 2 | $SiO_2 \cdot ZrO_2$ | γ-glycidoxypropyl trimethoxysilane | $10.4 \times 10^{-40}$ |
| Ex. 3 | $SiO_2 \cdot TiO_2$ | γ-glycidoxypropyl trimethoxysilane | $10.4 \times 10^{-40}$ |
| Ex. 4 | $SiO_2 \cdot Al_2O_3$ + $SiO_2 \cdot ZrO_2$ | γ-glycidoxypropyl trimethoxysilane | $10.4 \times 10^{-40}$ |
| Ex. 5 | $SiO_2 \cdot SnO_2$ | γ-glycidoxypropyl trimethoxysilane | $10.4 \times 10^{-40}$ |
| Ex. 6 | $SiO_2 \cdot In_2O_3$ | γ-glycidoxypropyl trimethoxysilane | $10.4 \times 10^{-40}$ |
| Ex. 7 | $SiO_2 \cdot Al_2O_3$ | vinyltrimethoxy silane | $4.0 \times 10^{-40}$ |
| Ex. 8 | $SiO_2 \cdot Sb_2O_5$ | vinyltrimethoxy silane | $4.0 \times 10^{-40}$ |
| Ex. 9 | $SiO_2 \cdot WO_3$ | γ-methacryloxy propyltrimethoxy silane | $12.7 \times 10^{-40}$ |
| Ex. 10 | $SiO_2 \cdot Al_2O_3$ | polystyrene | $8.5 \times 10^{-38}$ |
| Ex. 11 | $SiO_2 \cdot Al_2O_3$ | polymethyl methacrylate | $4.8 \times 10^{-40}$ |
| Ex. 12 | $SiO_2 \cdot Al_2O_3$ | n-butanol | $7.3 \times 10^{-38}$ |
| Comp. Ex. 1 | $SiO_2 \cdot Al_2O_3$ | — | |
| Comp. Ex. 2 | $SiO_2 \cdot Al_2O_3$ | monomethyl trimethoxysilane | $1.9 \times 10^{-40}$ |
| Comp. Ex. 3 | $SiO_2 \cdot ZrO2$ | — | |

| | Dispersion medium | | Stability I | |
|---|---|---|---|---|
| | | dielectric constant | sulfuric acid | hydrochloric acid |
| Ex. 1 | ethylene glycol | 38 | stable at least 6 mo. | stable at least 6 mo. |
| Ex. 2 | ethylene glycol | 38 | stable at least 6 mo. | stable at least 6 mo. |
| Ex. 3 | ethylene glycol | 38 | stable at least 6 mo. | stable at least 6 mo. |
| Ex. 4 | ethylene glycol | 38 | stable at least 6 mo. | stable at least 6 mo. |

TABLE 1-continued

| | | | | |
|---|---|---|---|---|
| Ex. 5 | N-methyl pyrrolidone | 32 | stable at least 6 mo. | stable at least 6 mo. |
| Ex. 6 | γ-butyro lactone | 39 | stable at least 6 mo. | stable at least 6 mo. |
| Ex. 7 | ethylene glycol | 38 | stable at least 6 mo. | stable at least 6 mo. |
| Ex. 8 | ethylene glycol | 38 | stable at least 6 mo. | stable at least 6 mo. |
| Ex. 9 | methyl cellosolve | 17 | stable at least 6 mo. | stable at least 6 mo. |
| Ex. 10 | ethylene glycol | 38 | stable at least 6 mo. | stable at least 6 mo. |
| Ex. 11 | ethylene glycol | 38 | stable at least 6 mo. | stable at least 6 mo. |
| Ex. 12 | ethylene glycol | 38 | stable at least 6 mo. | stable at least 6 mo. |
| Comp. Ex. 1 | ethylene glycol | 38 | visc. up 15 days | visc. up 20 days |
| Comp. Ex. 2 | ethylene glycol | 38 | gelled 30 days | gelled 40 days |
| Comp. Ex. 3 | N-methyl pyrrolidone | 32 | gelled 20 days | gelled 20 days |

TABLE 2

| | Sol composition | Modifying organic compound | mol. polarizability |
|---|---|---|---|
| Ex. 1 | $SiO_2 \cdot Al_2O_3$ | γ-glycidoxypropyl trimethoxysilane | $10.4 \times 10^{-40}$ |
| Comp. Ex. 2 | $SiO_2 \cdot Al_2O_3$ | — | — |
| Ex. 13 | $SiO_2$ | γ-glycidoxypropyl trimethoxysilane | $10.4 \times 10^{-40}$ |
| Comp. Ex. 4 | $SiO_2$ | — | — |

| | Dispersion medium | dielectric constant | Stability II (day) |
|---|---|---|---|
| Ex. 1 | ethylene glycol | 38 | 62 |
| Comp. Ex. 1 | ethylene glycol | 38 | 4 |
| Ex. 13 | water | 77 | 43 |
| Comp. Ex. 4 | water | 77 | 2 |

TABLE 3

| | Sol composition | Modifying organic compound | mol. polarizability | Dispersion medium | dielectric constant | Stability III (day) |
|---|---|---|---|---|---|---|
| Ex. 1 | $SiO_2 \cdot Al_2O_3$ | γ-glycidoxypropyl trimethoxysilane | $10.4 \times 10^{-40}$ | ethylene glycol | 38 | 14 |
| Comp. Ex. 1 | $SiO_2 \cdot Al_2O_3$ | — | — | ethylene glycol | 38 | 1 |
| Ex. 13 | $SiO_2$ | γ-glycidoxypropyl trimethoxysilane | $10.4 \times 10^{-40}$ | water | 77 | 41 |
| Comp. Ex. 4 | $SiO_2$ | — | — | water | 77 | 2 |

TABLE 4

| | Sol composition | Modifying organic compound | mol. polarizability | Dispersion medium | dielectric constant | Stability IV (min) |
|---|---|---|---|---|---|---|
| Ex. 13 | $SiO_2$ | γ-glycidoxypropyl trimethoxysilane | $10.4 \times 10^{-40}$ | water | 77 | 2880 |
| Comp. Ex. 4 | $SiO_2$ | — | — | water | 77 | 60 |

TABLE 5

| | Sol composition | Modifying organic compound | mol. polarizability | Dispersion medium | dielectric constant | Stability V (day) |
|---|---|---|---|---|---|---|
| Ex. 13 | $SiO_2$ | γ-glycidoxypropyl trimethoxysilane | $10.4 \times 10^{-40}$ | water | 77 | 60 |
| Comp. Ex. 4 | $SiO_2$ | — | — | water | 77 | 2 |

What is claimed is:

1. An inorganic compound sol comprising a dispersion medium having a dielectric constant of from 10 to 85 and, dispersed therein, inorganic compound particulates having average particle size from about 11 to 30 nm whose surface has been modified by an organic compound which is selected from the class consisting of vinylsilane compounds, acrylsilane compounds, epoxysilane compounds, aminosilane compounds, γ-mercaptopropyltrimethoxysilane and γ-chloropropyltrimethoxysilane, exhibiting a molecular polarizability of from $2 \times 10^{-40}$ to $850 \times 10^{-40}$ $C^2 m^2 J^{-1}$, wherein the inorganic compound particulates are composite oxide particulates composed of silica and at least one inorganic oxide other than silica, with the weight ratio of silica to at least one inorganic oxide other than silica being 3 to 500, wherein the silica containing composite oxides are produced by simultaneously adding an alkali metal silicate and an alkali soluble inorganic oxide to an alkali aqueous solution, and wherein the inorganic compound sol is stable in the presence of species selected from the group consisting of ionic components, salts and surfactants, wherein the at least one inorganic oxide other than silica is selected from $Al_2O_3$, $ZrO_2$, $TiO_2$, $SnO_2$, $In_2O_3$, $Sb_2O_5$ and $WO_3$.

* * * * *

UNITED STATES PATENT AND TRADEMARK OFFICE
CERTIFICATE OF CORRECTION

| | |
|---|---|
| PATENT NO. | : 7,192,986 B2 |
| APPLICATION NO. | : 09/038230 |
| DATED | : March 20, 2007 |
| INVENTOR(S) | : Koyanagi et al. |

Page 1 of 1

It is certified that error appears in the above-identified patent and that said Letters Patent is hereby corrected as shown below:

<u>Title of the Patent</u>, See Item (57) ABSTRACT, Line 5, "$C^2m^2J^{-2}$" should read -- $C^2m^2J^{-1}$ --

Signed and Sealed this

Seventh Day of August, 2007

JON W. DUDAS
*Director of the United States Patent and Trademark Office*